United States Patent [19]

Ichinose

[11] 4,065,980

[45] Jan. 3, 1978

[54] DRIVING METHOD AND APPARATUS

[76] Inventor: Shiro Ichinose, 11-8, 4-chome, Shinohara Kita, Nada, Kobe, Hyogo, Japan

[21] Appl. No.: 695,391

[22] Filed: June 14, 1976

[51] Int. Cl.$^2$ ........................ F16H 57/00; F16H 55/04

[52] U.S. Cl. .......................................... 74/404; 74/435

[58] Field of Search .................................. 74/435, 404

[56] References Cited

U.S. PATENT DOCUMENTS 3,268,748 8/1966 Bucheister et al. ................ 74/404 X 3,766,794 10/1973 Wilcox ................................ 74/404 X

*Primary Examiner*—Leonard H. Gerin

*Attorney, Agent, or Firm*—Sherman & Shalloway

[57] ABSTRACT

A method for driving an output shaft in the normal direction and the reverse direction alternately, which comprises performing alternately an operation of engaging a partially toothed wheel connected to the output shaft with a partially toothed wheel driven in the normal direction and an operation of engaging the partially toothed wheel connected to the output shaft with a partially toothed wheel driven in the reverse direction, wherein a cam follower mounted on the output shaft is caused to fall into engagement with a driven and rotated cam at the start and completion of rotation for one of said two operations, whereby acceleration is given to the output shaft at the start of the rotation and the speed of the output shaft is reduced at the completion of the rotation.

10 Claims, 13 Drawing Figures

Fig. 5-A
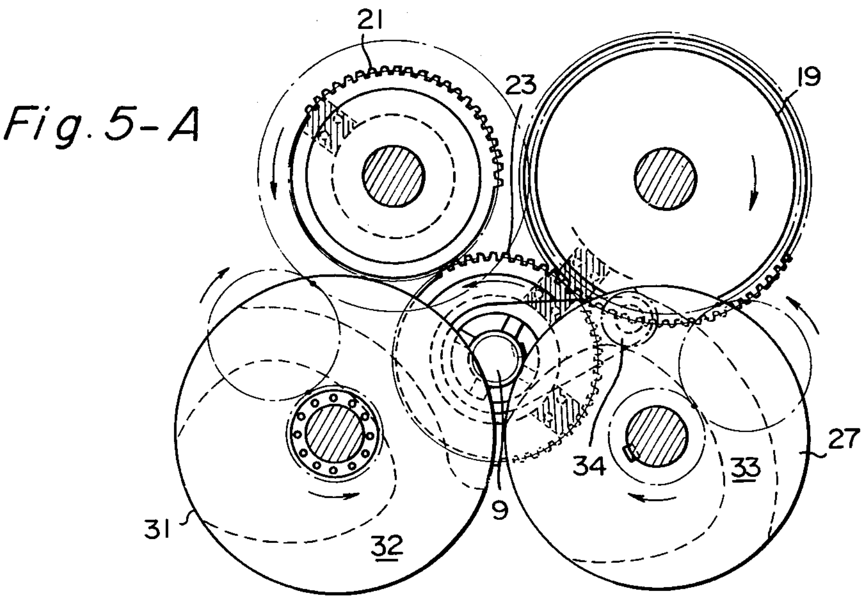
Fig. 5-B
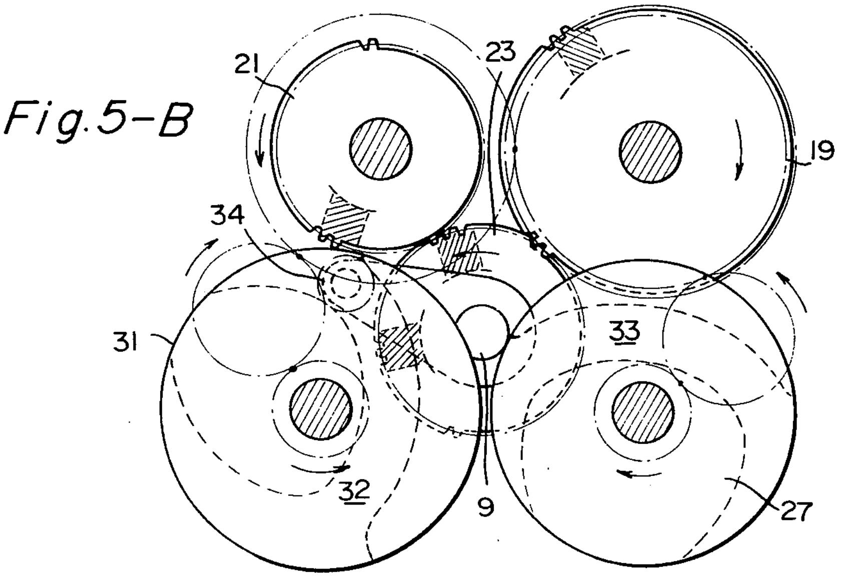

Fig. 5-C
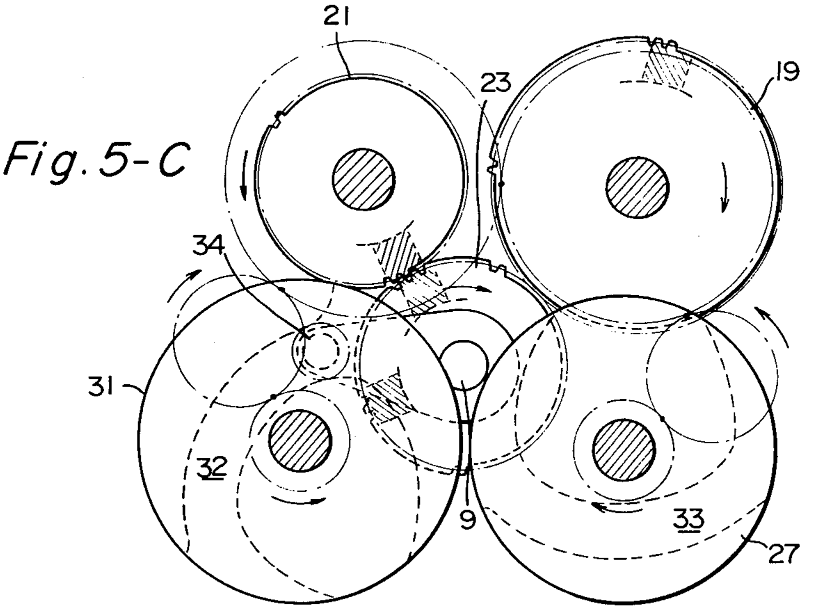
Fig. 5-D
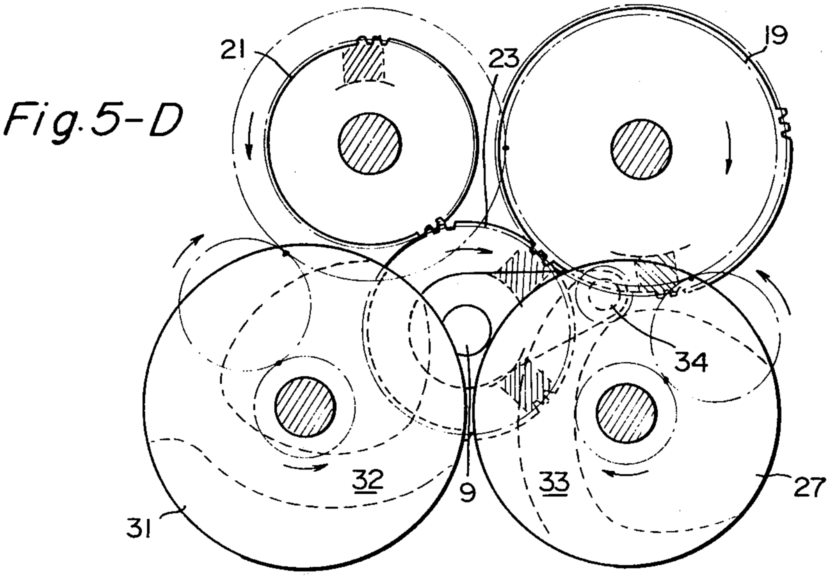

Fig. 5-E
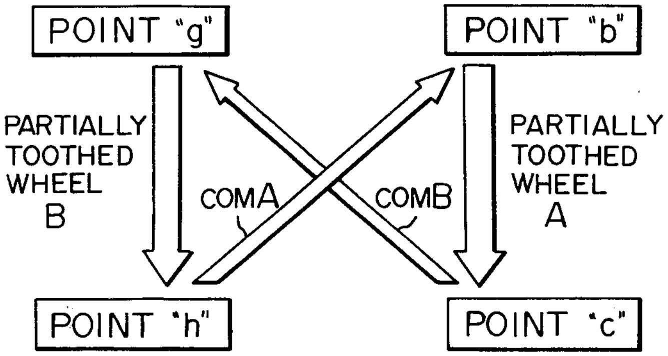

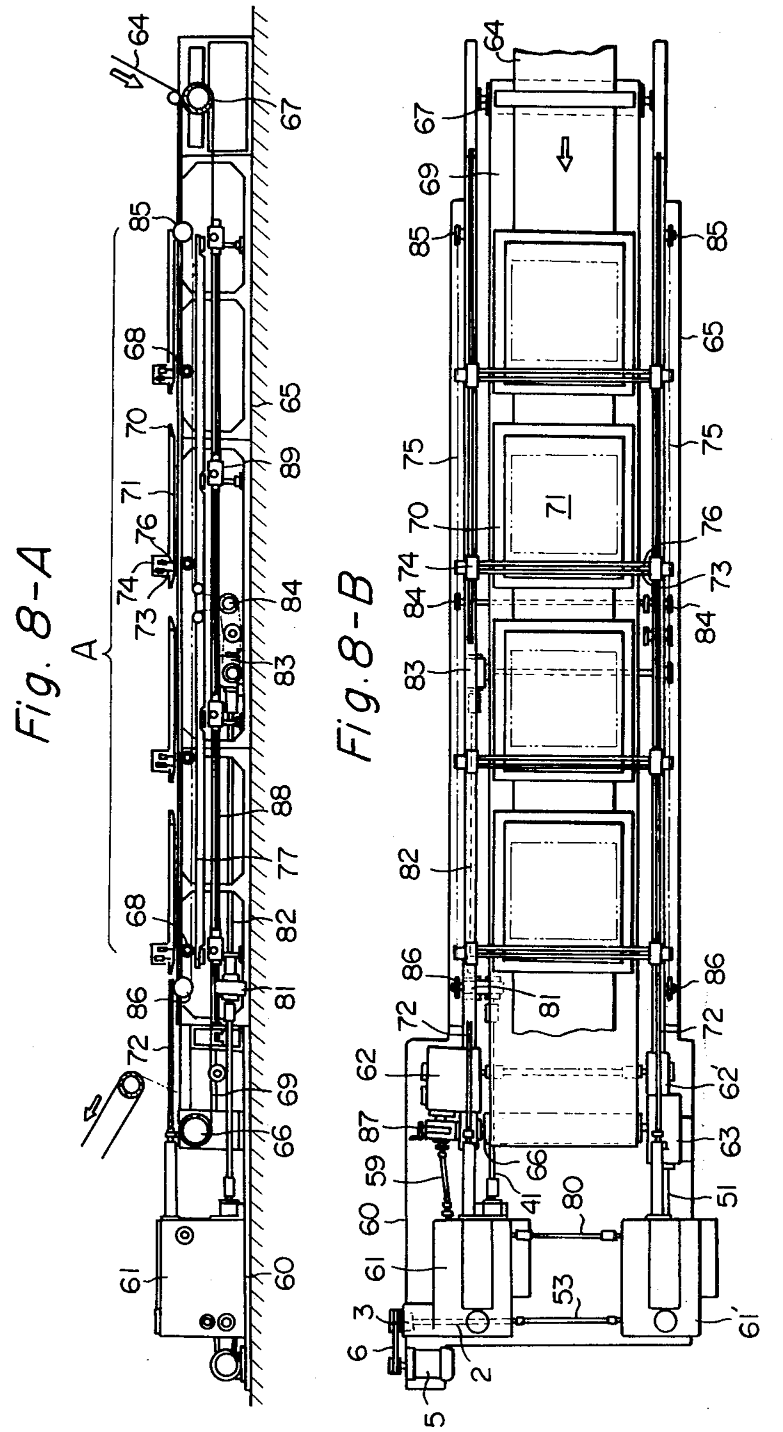
Fig. 8-A
Fig. 8-B

DRIVING METHOD AND APPARATUS

This invention relates to a method for driving an output shaft in the normal and reverse directions alternately and an apparatus for practising this driving method. More specifically, the invention relates to a method for driving and rotating an output shaft reciprocatively in the normal direction and the reverse direction, in which when the rotation direction is changed, acceleration is given to the output shaft at the start of rotation in one direction, the shaft is rotated at a constant speed in one direction and the speed is reduced at the completion of rotation in one direction, and in which these operations are performed precisely according to a mechanically controlled program, and an apparatus for practising this method.

A mechanism for reciprocating a material along a certain running passage has heretofore been applied in various fields, for example, for scanning exposure in a copying machine, scanning of a squeegee in a screen printing machine or dye printing machine, movement of a platen in a typewriter and movement of a material to be processed in a machine tool.

However, in reciprocating mechanisms of this type, it is very difficult to perform the reciprocative movement of a material in the precisely located state and perform various operations for the reciprocative movement, such as accelerated advance, constant speed advance, reduced speed advance and stopping, according to a precisely controlled program.

As driving means for such reciprocative movement, there have heretofore been used a driving motor capable of rotating in both the normal direction and the reverse direction and a driving system including two electromagnetic clutches for connecting an output shaft alternately to a normal direction rotation shaft and a reverse direction rotation shaft.

Various limit switches or photoelectric switches are generally used in combination with electromagnetic clutches or the like for controlling positions of members making a reciprocative movement and timings of their movements. According to such electric control system, however, because of deviations or delays of the operation time of such switch or electromagnetic mechanism it is generally impossible to control timings of movements of respective members precisely.

Further, when a member or material having a relatively heavy weight is reciprocated, it is generally difficult to prevent generation of shocksat a point of starting, stopping or turning in the reverse direction such member or material. When such shocks are absorbed by using a suitable mechanism, exact control of the abovementioned timings is made further difficult by provision of such shock-absorbing mechanism.

As driving means for performing a reciprocative movement along a relatively short distance, there have heretofore been used various cam mechanisms and crank mechanisms. In these driving systems, however, it is difficult to reciprocate a material or member along a sufficiently long distance and it is also difficult to maintain a sufficient distance for the constant speed movement. Therefore, these mechanisms can hardly be practically used in the above mentioned fields.

As will readily be understood from the foregoing illustration, it is eagerly desired in the art to develop a driving system for reciprocative movement in which sufficient time and distance can be provided for the constant speed movement of a material or member to be driven and at either the start or the completion of the movement, acceleration and speed reduction can be performed with high accuracy according to a strictly controlled program.

Recently, there has been proposed an automatic screen printing method comprising feeding a material to be printed into a printing operation zone, transporting in the supported state the material to be printed continuously at a constant speed in the lengthwise direction, moving a flat screen having a certain length in the longitudinal direction thereof along the material to be printed at the same speed in the same direction as the material to be printed to cause thematerial to be printed, which is being transported on a supporting and transporting member, to fall in contact with the flat screen, scanning a squeegee member disposed above said flat screen from one end of the flat screen to the other end to thereby print said material, releasing the contact between the flat screen and the supporting and transporting member just before the squeegee member arrives at the other end of the flat screen, moving the squeegee member and the flat screen in a direction reverse to the moving direction for the printing operatin to return said squeegee member and said flat screen to the original printing-starting positions, and repeating the foregoing operations.

This automatic printing method is characterized in that a printing operation can be performed while a material to be printed is fed continuously at a constant speed, but the actual working of this printing invovles various difficulties. For example, according to this automatic screen printing method, the operation of moving the printing stencil at the same speed in the same direction as the material to be printed and the operation of moving the printing stencil in the reverse direction after the printing step should be conducted so that the positions of the stencil and the material are made exactly in accord with each other for every repeat of a pattern to be printed, and timings of these operations should be exactly controlled so as to obtain a good matching between the stencil and the material for every repeat of the pattern. More specifically, in the automatic screen printing method of this type, since a material to be printed is continuously fed at a constant speed, control of positions of respective moving members and control of timings of respective operations are much more difficult than in the conventional printing method in which a material to be printed is stopped at the time of printing.

It is therefore a primary object of this invention to provide a method and apparatus for driving an output shaft in the normal and reverse directions alternately, in which operations of imparting acceleration to the shaft at the start of rotation in one direction, rotating the shaft in one direction at a constant speed and reducing the speed at the completion of rotation in one direction are performed precisely according to a mechanically controlled program.

Another object of the present invention is to provide a method and apparatus for driving an output shaft in the normal direction and the reverse direction alternatively, which can be effectively used as driving means for reciprocating a member along a certain running passage and in which a sufficient distance or time can be provided for advancing or retreating the member at a constant speed and acceleration or speed reduction at the advance or retreat of the member can be performed according to a strictly controlled program.

Still another object of the present invention is to provide a method and apparatus for driving an output shaft in the normal direction and the reverse direction alternately, in which no substantial mechanical shocks are caused at the start and completion of rotation in either of the two directions and rotation in either the normal direction or the reverse direction can be performed very smoothly.

A further object of the present invention is to provide a driving method and apparatus which can be used especially preferably for reciprocative movements of various members and mechanisms in flat screen printing processes, especially the above-mentioned automatic printing process in which a material to be printed is fed continuously at a constant speed.

In accordance with the present invention, there is provided a method for driving an output shaft in the normal direction and the reverse direction alternately, which comprises performing alternately an operation of engaging a partially toothed wheel connected to the output shaft with a partially toothed wheel driven in the normal direction and an operation of engaging the partially toothed wheel connected to the output shaft with a partially toothed wheel driven in the reverse direction, wherein a cam follower mounted on the output shaft is caused to fall engagement with a driven and rotated cam at the start and completion of rotation for one of said two operations, whereby acceleration is given to the output shaft at the start of the rotation and the speed of the output shaft is reduced at the completion of the rotation.

In accordance with the present invention, there is also provided an apparatus for driving an output shaft in the normal direction and the reverse direction alternately, which comprises a partially toothed wheel C connected to the output shaft, a normal direction-driven, partially toothed wheel A which is engaged with said partially toothed wheel C and driven and rotated in one direction and a reverse direction-driven, partially toothed wheel B which is engaged with said partially toothed wheel C and driven and rotated in a direction reverse to the rotation direction of said partially toothed wheel A, said partially toothed wheels A, B and C being disposed in such a relationship that said partially toothed wheel C is engaged alternately with said partially toothed wheel A and with said partially toothed wheel B, wherein a cam follower is fixed to the output shaft and first and second cams (b) and (a) are mounted, each of which is driven and rotated at a certain speed and is capable of being engaged with said cam follower, said cam follower and said first and second cams (b) and (a) being disposed in such a relationship that at the time of termination of the normal rotation of the output shaft by said normal direction-driven, partially toothed wheel A, the cam follower is engaged with a cam groove of said first cam (b) to reduce the speed of the normal rotation of the output shaft, stop the output shaft and accelerate the output shaft to turn in the reverse direction, and at the time of termination of the reverse rotation of the output shaft by said reverse direction-driven, partially toothed wheel B, the cam follower is engaged with a cam groove of said second cam (a) to reduce the speed of the reverse rotation of the output shaft, stop the output shaft and accelerate the output shaft to turn in the normal direction.

The present invention will now be described in detail by reference to the accompanying drawings, in which.

Figure 4:
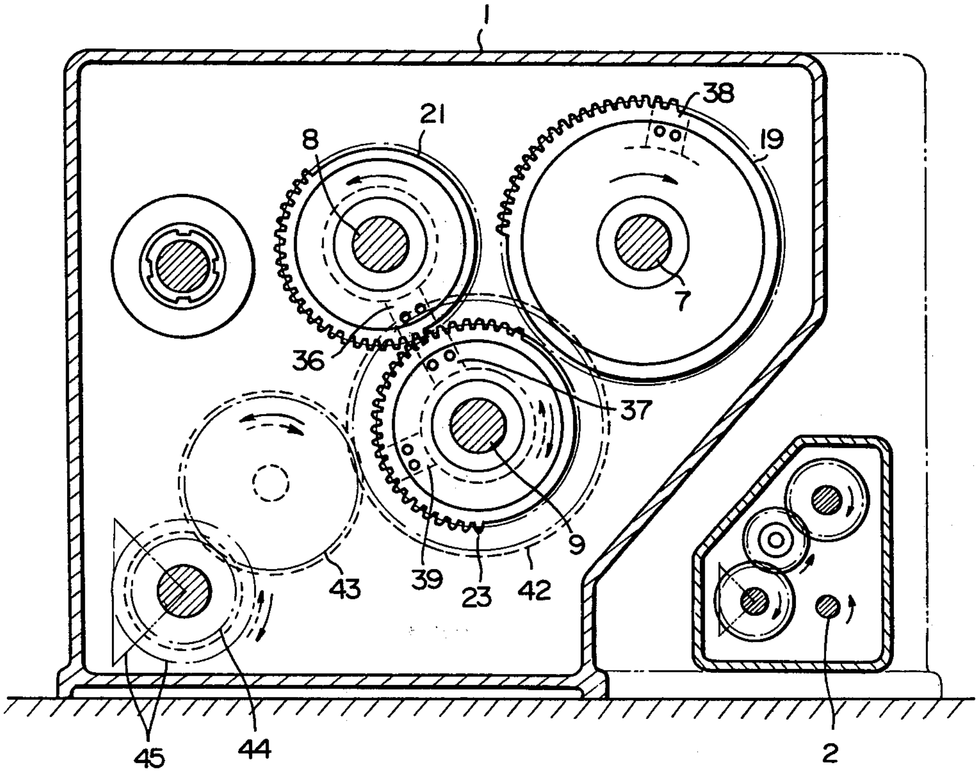
FIG. 4 is a view showing the section taken along the line Z—Z in FIG. 1.
Figure 6:
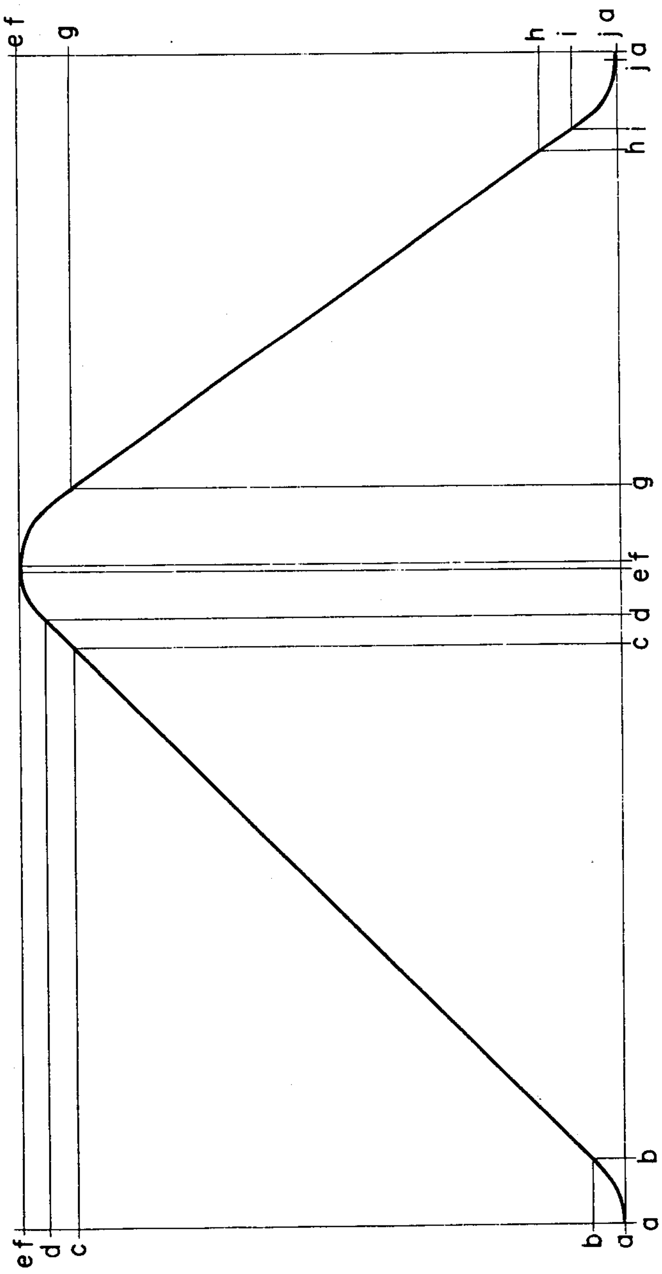
Figure 7:
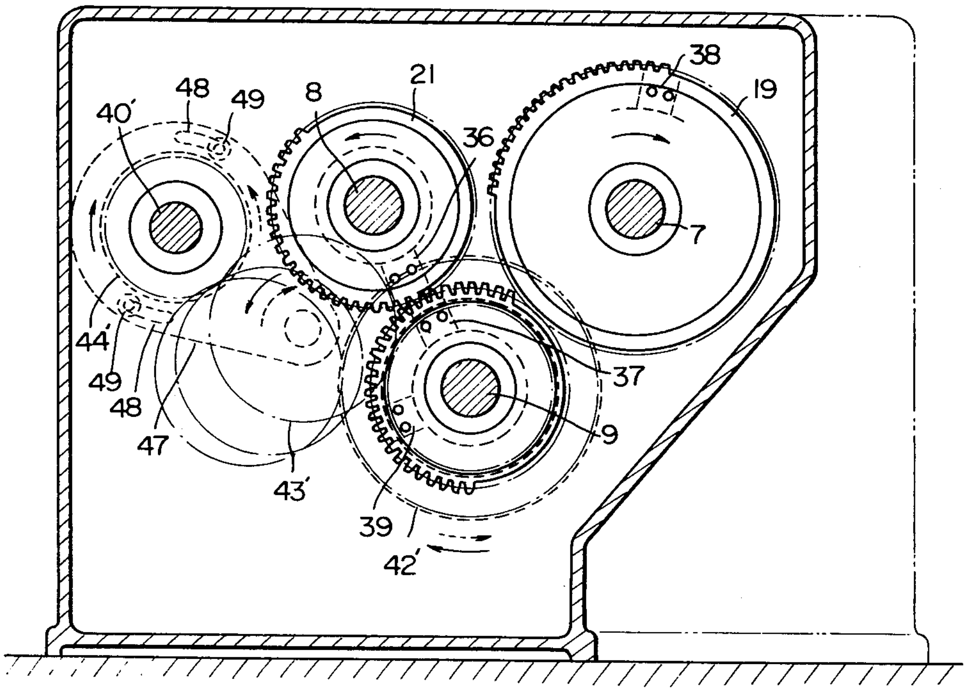

FIGS. 5-A to 5-D are diagrams illustrating operations of partially toothed wheels and cams in the driving apparatus of the present invention, FIG. 5-A showing the state at the start of the constant speed return course, FIG. 5-B showing the state at the completion of the constant speed return course, FIG. 5-C showing the state at the start of the constant speed advance course and FIG. 5-D showing the state at the completion of the constant speed advance course;

FIG. 5-E is a diagram illustrating sequences of operations at respective courses;

FIG. 6 is a graph illustrating displacements of the shaft for driving in the normal direction and the reverse direction alternately;

FIG. 7 is a sectional view same as FIG. 4 except that an idle gear 43' is disposed so that it can swing;

FIG. 8-A is a side view showing the arrangement in which the apparatus of the present invention is applied to an automatic flat screen printing machine; and FIG. 8-B is a front view of the arrangement illustrated in FIG. 8-A.

Figure 1:
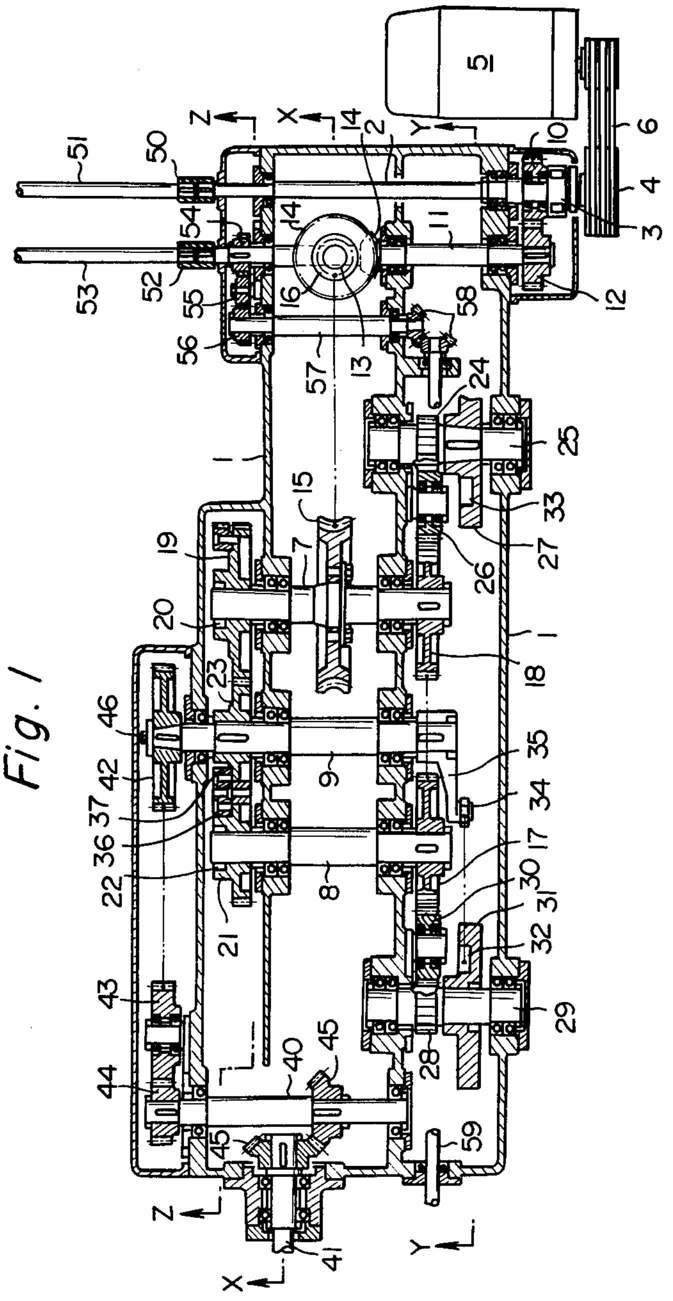
FIG. 1 is a developed sectional view of one embodiment of the driving apparatus of the present invention.

Referring now to FIGS. 1 to 4 showing one embodiment of the present invention to be used especially preferably as the driving apparatus in the automatic flat screen printing process, a main driving shaft 2 is rotatably mounted on one corner of a machine frame 1 through a bearing, and a pulley 4 is mounted on one end of the main shaft 2 through an electromagnetic clutch 3 (see FIG. 1 ). A V-belt is stretched between the pulley 4 and a pulley of a driving motor 5 so that a continuous one-way rotation of the motor 5 is transmitted to the main shaft 2.

A reverse direction driving shaft 7, a normal direction driving shaft 8 and a shaft 9 for driving alternately in the normal direction and the reverse direction are rotatably mounted on the machine frame 1 through bearings appropriately spacedly from one another, and the rotation of the main driving shaft 2 is transmitted to the reverse direction driving shaft 7 and the normal direction driving shaft 8 through suitable power transmission mechanisms or reduction gear mechanisms.

More specifically, a gear 10 fixed to the main shaft 2 is engaged with a gear 12 fixed to a power transmission shaft 11, and a second power transmission shaft 13 extending in the direction rectangular to the shaft 11 is engaged with the shaft 11 through a pair of bevel gears 14 fixed to both the shafts 11 and 13, respectively.

A worm gear 15 is fixed to the reverse direction driving shaft 7, and when this worm gear 74 is engaged with a worm 16 fixed to the power transmission shaft 13, the reverse direction driving shaft 7 is rotated in the clockwise direction. A cam driving gear 17 is fixed to one end of the normal direction driving shaft 8, and when this gear 17 is engaged with another cam driving gear 18 fixed to one end of the reverse direction driving shaft 7, the normal direction driving shaft 8 is rotated in the counterclockwise direction.

A partially toothed wheel B indicated by reference numeral 19 is attached to the reverse direction driving shaft 7 so that it can be adjusted by a fine adjustment coupling 20, and a partially toothed wheel A indicated by reference numeral 21 is attached to the normal direction driving shaft 8 so that it can be adjusted by a fine adjustment coupling 22. Apartially toothed wheel C indicated by reference numeral 23 is fixed to the shaft 67 for reciprocative rotation in normal and reverse directions so that the partially toothed wheel C is located on the same plane as of the partially toothed wheels A and B.

In order to perform speed reduction, stopping and acceleration of a reciprocating member strictly according to a mechanically controlled program, there are employed a cam B for controlling reduced speed advance, stopping and accelerated retreat and a cam A for controlling reduced speed retreat, stopping and accelerated advance, and the above control is performed by engaging a cam follower pivoted on the partially toothed wheel C alternately with the cam A and the cam B. This arrangement will now be described in detail.

Figure 3:
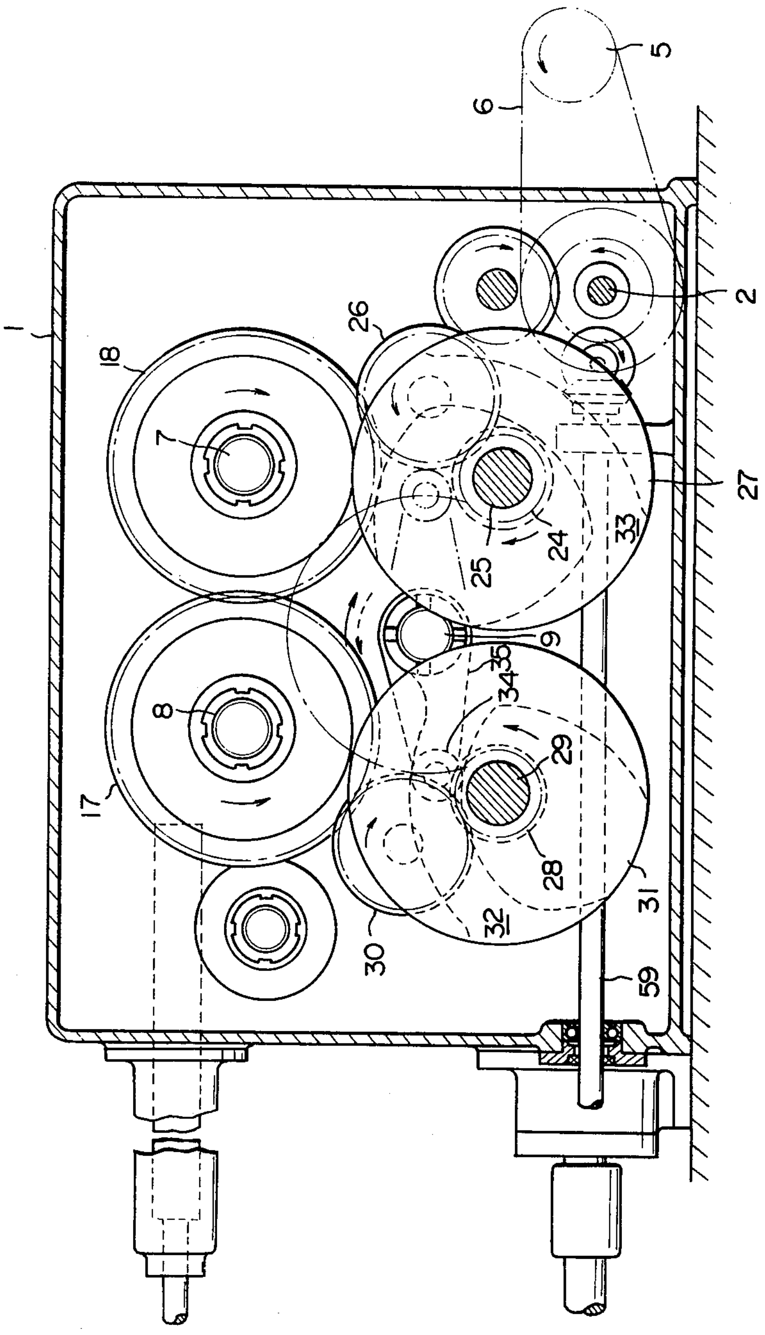
FIG. 3 is a view showing the section taken along the line Y—Y in FIG. 1.

Referring now to FIGS. 1 and 3, a first cam driving shaft 25 provided with a spur gear 24 is disposed in parallel to the reverse direction driving shaft 7, and when the spur gear 24 is engaged with a cam driving gear 25 through an idle gear 26, the cam driving shaft 25 is driven in the clockwise direction to rotate in the clockwise direction the cam B for controlling reduced speed advance, stopping and accelerated retreat of the reciprocative member, which cam is indicated by reference numeral 27. Similarly, a second cam driving shaft 29 provided with a spur gear 28 is disposed through a bearing on the frame 1 in parallel to the normal direction driving shaft 8, and when the spur gear 28 is engaged with a cam driving gear 17 of the normal direction driving shaft 8 through an idle gear 30, the cam driving shaft 29 is driven in the counter-clockwise direction to rotate in the counter-clockwise direction the cam A for controlling reduced speed retreat, stopping and accelerated advance of the reciprocative member, which cam is indicated by reference numeral 31. Cam grooves 32 and 33 are formed on the cam A (31) and the cam B (27), respectively. An arm 35 provided with a cam roller 34 is fixed to one end of the shaft 9 for reciprocative rotation in the normal direction and reverse direction. The cam roller 34 is located on the same plane as of the cam grooves 32 and 33, and when the arm 35 is turned and the cam roller 34 is engaged with the cam groove 32 or 33, the above-mentioned control of speed reduction, stopping and acceleration is conducted.

The cam driving shafts 25 and 29 are driven and rotated at speeds synchronized with the speeds of the reverse direction driving shaft 7 and the normal direction driving shaft 8; namely the rotation numbers of the cam driving shafts 25 and 29 are integral multiples of the rotation numbers of the reverse direction driving shaft 7 and normal direction driving shaft 8. In general, when the cam driving shafts 25 and 29 are rotated at rotation numbers at least two times the rotation numbers of the shafts 7 and 8, control of speed reduction, stopping and acceleration can be accomplished very precisely. In the embodiment shown in the drawings, the rotation number of the shaft 7 is equal to the rotation number of the shaft 8, and each of the rotation numbers of the shafts 25 and 29 is 3 times the rotation number of the shafts 27 and 8.

The positions and tooth numbers of the partially toothed wheels A, B and C are set so that the partially toothed wheel C (23) is engaged with the partially toothed wheel A (21) only on the constant speed driving in the normal direction and the partially toothed wheel C (23) is engaged with the partially toothed wheel B (19) only on the constant speed driving in the reverse direction. At the position where engagement between the normal direction driven partially toothed wheel A (21) and the partially toothed wheel C (23) begins, planted teeth 36 and 37 are disposed for reinforcement, and another planted teeth 38 and 39 are similarly disposed for reinforcement at the position where engagement between the reverse direction driven partially toothed wheel B (19) and the partially toothed wheel C (23) begins.

Operations of respective partially toothed wheels and cams of the above-mentioned driving device will be apparent from FIGS. 5-A to 5-D illustrating the respective operations, FIG. 5-E illustrating the sequence of the operations and FIG. 6 illustrating displacements of the shaft for driving in the normal and reverse directions.

In FIG. 5-A showing the state where each number is at the position of the return course (the position of the start of the start of the constant speed driving in the reverse direction; the position *g* in FIGS. 5-E and 6), the partially toothed wheel C (23) is engaged with the partially toothed wheel B (19) and the cam roller 34 is going to separate from the cam groove 33 of the cam B (27). In this state, the partially toothed wheel C (23) is driven in the counter-clockwise direction by the partially toothed wheel B (19) and with this rotation of the partially toothed wheel C (23), the shaft 9 for reciprocative rotation in the normal and reverse directions is driven and rotated at a constant speed in the counter-clockwise direction (in the reverse direction; in the return direction), whereby the shaft 9 is caused to make a displacement of inclined line *g-h* in FIG. 6. With this displacement, the engagement of the cam roller 34 with the cam groove 33 is released and the cam roller 34 is rotated in the counter-clockwise direction.

In FIG. 5-B showing the state where each member is at the position of the completion of the return course (the position of the start of the reduced speed driving in the reverse direction; the position *h* in FIGS. 5-E and 6), the partially toothed wheel C (23) is at the position where its engagement with the partially toothed wheel B (19) is released, and the cam roller 34 is at the position where it begins to fall in engagement with the cam groove 32 of the cam A (31). From this state, the partially toothed wheel C (23) is moved and it is not engaged with the partially toothed wheel B (19) or A (21), but the cam roller 34 is engaged with the cam groove 32 of the cam A (31) and is driven in the counter-clockwise direction, whereby it is driven at the constant speed in the reverse direction to some extent; namely it is caused to make a displacement of line *h–i* in FIG. 6. Then, the cam roller 34 is engaged with the speed-reducing part of the cam groove 32, whereby it is rotated at a reduced speed in the reverse direction; namely it is caused to make a displacement of curve *i–j* in FIG. 6. Then, the cam roller 34 is engaged with the stopping part of the cam groove 32, whereby the cam roller 34 is stopped and in turn, the shaft 9 for reciprocative rotation in the normal and reverse directions is stopped (line *j–a* in FIG. 6). Subsequently, the cam roller 34 is engaged with the accelerating part of the cam groove 32, whereby the cam roller 34 is accelerated and driven in the normal direction and the rotation shaft 9 is driven in the clockwise direction ( a displacement of curve *a–b* in FIG. 6 is made).

In FIG. 5-C showing the state where each member is at the position of the start of the advance course (the position of the start of the driving in the normal direction; namely the position *b* in FIGS. 5-E and 6), the partially toothed wheel C (23) is engaged with the partially toothed wheel A (21) and the cam roller 34 is at the position where it is going to separate from the cam groove 32 of the cam A (31). In this state, the partially toothed wheel C (23) is driven in the clockwise direction by the partially toothed wheel A (21), and simultaneously, the shaft 9 for reciprocative rotation in the normal and reverse directions is driven and rotated at a constant speed in the clockwise direction (in the normal direction; in the direction of advance) and is caused to make a displacement of line *b–c* in FIG. 6. With this displacement of the shaft 9, the cam roller 89 is released from its engagement with the cam groove 32 and is rotated in the clockwise direction.

In FIG. 5-D showing the state where each member is at the position of the completion of the advance course (the position of the start of the reduced speed driving in the normal direction; namely the position *c* in FIGS. 5-E and 6), the partially toothed wheel C (23) is at the position where its engagement with the partially toothed wheel A (21) is released, and the cam roller 34 begins to fall in engagement with the cam groove 33 of the cam B (27). In this state, the partially toothed wheel C (23) is moved and is not engaged with the partially toothed wheel A (21) or B (19), but the cam roller 34 is engaged with the constant speed driving part of the cam groove 33, whereby the cam roller 34 is rotated in the clockwise direction at a constant speed to some extent; namely a displacement of line *c–d* in FIG. 6 is made by the shaft 9 for reciprocative rotation in the normal and reverse directions. Then, the cam roller 34 is engaged with the speed-reducing part of the cam groove 33, whereby the cam roller 34 is rotated in the normal direction at a reduced speed to make a displacement of curve *d–e* in FIG. 6. Subsequently, the cam roller 34 is engaged with the stopping part of the cam groove 33, whereby the cam roller 34 is stopped and in turn, the shaft 9 for reciprocative rotation in the normal and reverse directions is stopped (line *e–f* in FIG. 6). Subsequently, the cam roller 34 is engaged with the accelerating part of the cam groove 33, whereby the cam roller 34 is accelerated and driven in the reverse direction and the shaft 9 for reciprocative rotation in the normal and reverse direction is driven in the counter-clockwise direction (a displacement of curve *f–g* in FIG. 6 is made).

Thus, each member in the driving apparatus is returned to the position of the start of the return course (the position *g* in FIGS. 5-E and 6), and the above-mentioned operations are repeated. In the above illustrated embodiment of the present invention, since the driving of the shaft 9 for reciprocative rotation in the normal and reverse directions is performed in good order precisely by the partially toothed wheels A and B and cams A and B driven at synchronized speeds as most clearly illustrated in FIGS. 5-E and 6, each of the scanning reciprocative movements of the squeegee member, namely accelerated advance, constant speed advance, reduced speed advance, stopping, accelerated retreat, constant speed retreat and stopping, can be performed at a good timing without any deviation. Further, by skillfully combining the operation of driving at a constant speed the shaft 9 for reciprocative rotation in the normal and reverse directions by using gears with the operation of speed reduction, stopping and acceleration of the shaft 9 by using the cam mechanism, the respective operations of the reciprocative movement can be performed precisely according to the mechanically controlled program while preventing generation of mechanical shocks by the reciprocative movement.

In the method of the present invention, the speed for driving in the normal direction the shaft 9 for reciprocative rotation may be the same as or different from the speed for driving the shaft 9 in the reverse direction. These speeds can easily be adjusted by changing the diameters of the partially toothed wheels A (21) and B (19) to be engaged with the partially toothed wheel C (23). For example, if the diameter of the reverse direction driven partially toothed wheel B (19) is smaller than the diameter of the normal direction driven partially toothed wheel A (21) as shown in the accompanying drawings, the speed for driving the shaft 9 in the reverse direction is made higher than the speed for driving the shaft 9 in a normal direction.

Degrees and patterns of speed reduction, stopping and acceleration by the cam A (31) and cam B (27) can be adjusted relatively freely by changing the shapes of the cam grooves 32 and 33 formed on the cams 31 and 27, respectively. In general, it is preferred to use cam grooves 32 and 33 having a shape of a modified trapezoid or modified sine curve at the accelerating part.

The power for reciprocative rotation in the normal and reverse directions may be directly taken out from the above-mentioned shaft 9 for driving in the normal and reverse directions by using the shaft 9 as the output shaft, or this driving power of the shaft 9 may be taken out through a suitable intermediate mechanism, for example, an accelerator, a reduction gear or a repeat length-adjusting device.

In the embodiment shown in FIGS. 1 to 4, a shaft 40 is disposed on the machine frame 1 through a bearing in parallel to the shaft 9 for reciprocative rotation in the normal and reverse directions, and an output shaft 41 for taking out the reciprocative rotation power is mounted on the machine frame 1 through a bearing rectangularly to the shaft 40.

In order to transmit rotations of the normal and reverse rotation shaft 9 in the normal and reverse directions to the output shaft 41, a spur gear 42 is fixed to the other end of this normal and reverse rotation shaft 9, and by a gear 44 engaged with this spur gear 42 through an idle gear 43, the reciprocative rotation of the shaft 9 in the normal and reverse directions is transmitted to the driving shaft 40. This driving shaft 40 is engaged with the output shaft 41 through a pair of bevel gears 45 fixed to the shafts 40 and 41, respectively, so that the reciprocative rotation of the shaft 40 in the normal and reverse directions is transmitted to the shaft 41.

Instead of the spur gear 42, a repeat-adjusting change gear 42' may be fixed to the shaft 9 for reciprocative rotation in the normal and reverse directions, so that it can be exchanged by a clamping mechanism 46 (see FIG. 1), as shown in FIG. 7. This feature is described below.

The reciprocative rotation of the shaft 9 in the normal and reverse directions is transmitted to a driving shaft 40′ through a fixed gear 44′ engaged with the change gear 42′ through an idle gear 43′. The free gear 43′ is pivoted on a swinging piece 47 capable of swinging with the shaft 40′ being as the center, and the fixed gear 44′ is always engaged with the change gear 42′ irrespective of the tooth number (diameter) of the repeat-adjusting change gear 42′. In order to adjust this engagement between the fixed gear 44′ and the change gear 42′, an arc-like long pin hole 48 is formed on the swinging piece 47, and a stud bolt 49 is appropriately inserted into the hole 48 to perform the positional adjustment and fixation (see FIG. 7).

When the tooth number is changed in the repeat-adjusting change gear 42′, the rotation speed of the output shaft 40′ is changed and in turn, the repeat length of the reciprocating movement is changed.

Conversion of the reciprocative rotation of the output shaft 41 or 40′ to a reciprocative linear movement can be performed by using a known mechanism. For example, a combination of a pinion and a rack, a combination of a sprocket and a roller chain and the like can optionally be used in the present invention.

The driving apparatus of the present invention specifically illustrated in FIGS. 1 to 4 is especially valuable as the driving system for reciprocating various members in an automatic flat screen printing machine. For this application, an additional power transmission mechanism is disposed in the apparatus shown in FIGS. 1 to 4. More specifically, a belt-driving connecting shaft 51 is mounted on the main driving shaft 2 through a coupling 50 to transport a material to be printed, and a connecting shaft 53 for driving a device similar to the driving apparatus shown in FIGS. 1 to 4 is mounted on the power transmission shaft 11 through a coupling 52.

A lifting device driving gear 54 is mounted on this power transmission shaft 11 to drive a lifting device described below, and the driving power of the motor 15 is transmitted to a lifting driving shaft 57 through a series of gears 55 and 56 and to the lifting device through a bevel gear 58 and a lifting output shaft 59.

In FIGS. 8-A and 8-B illustrating one instance of the application of the driving apparatus of the present invention, driving apparatuses 61 and 61′ according to the present invention are set on a basic bed 60 of an automatic flat screen printing machine together with a driving motor 5, lifting devices 62 and 62′ and an endless belt driving device 63.

A mechanism for supporting and transporting a material 64 to be printed comprises a driving roller 67 disposed on a machine frame 65 on both the sides of a plurality of printing zones A, receiving rollers 68 (see FIG. 8-A) disposed for respective printing zones, and an endless belt 69 supported and continuously driven by said driving, driven and receiving rollers 66, 67 and 69.

On the machine frame 65, there is disposed a guide rail (not shown) extending in the direction of running of the material to be printed, namely in the lengthwise direction of the machine frame 65.

In the printing zones A, flat screens 71 are supported on screen frames 70 above the running passage for the material 64 to be printed, namely above the upper portion of the endless belt 69, and the number of the screens 71 corresponds to the number of colors of a pattern to be printed. The screen frame 70 is supported on above guide rail through a suitable supporting mechanism (not shown) so that it can make a reciprocative movement in the horizontal direction along the endless belt 69. A plurality of such screen frames 70 are disposed on a screen-driving connecting shaft rod 72 at prescribed intervals.

Above the flat screen 71 there is disposed a squeegee member 73 supported on a squeegee supporting mechanism 74 to squeeze out a printing paste or ink (not shown) onto the material 64 to be printed. This squeegee supporting mechanism 74 is supported on the above guide rail so that it can make a reciprocative movement in the horizontal direction along the endless belt 69. A plurality of such squeegee supporting mechanisms 74 are fixed at prescribed intervals to a squeegee-driving connecting rod or roller chain 75 extending in the lengthwise direction of the machine frame 65.

A doctor blade 76 is mounted on the squeegee supporting mechanism 74 to return the printing paste or ink to the printing-starting end of the screen after the printing operation.

In order to contact the material 64 on the endless belt 69 with the flat screen 71 at the printing operation and release this contact during the period where the printing operation is not conducted (hereinafter referred to as "the non-pringing period"), the flat screen 71 and a part of the supporting and transporting mechanism, for example, the receiving roller 68, are arranged so that they can make relative vertical movements. In the embodiment shown in FIGS. 8-A and 8-B, a pair of the squeegee member 73 and the corresponding receiving roller 68 with the endless belt 69 interposed therebetween are arranged so that they can make a reciprocative movement in the horizontal direction, and during the printing operation, the receiving roller 68 is located at an elevated position to contact the material 64 with the printing screen and during the non-printing period, the receiving roller 68 is located at a lowered position to release the contact between the material 64 and the printing screen. A lifting rail 13 is disposed to reciprocate the receiving roller 68 in the horizontal direction and lift up or bring down the receiving roller 68 in the vertical direction.

In FIGS. 8-A and 8-B, driving the the endless belt 69, driving of the flat screen, driving of the squeegee supporting mechanism and vertical movement of the receiving roller 68 are performed by the single driving motor 5.

The driving power of the driving motor is transmitted to a known endless belt driving device 63 through the main shaft 2 and the belt-driving connecting shaft 51 to rotate continuously a driving roller 66 at a constant speed in the counter-clockwise direction in the drawings, whereby the endless belt 69 for supporting and transporting the material 64 to be printed is continuously driven at a constant speed in the counter-clockwise direction.

Figure 2:
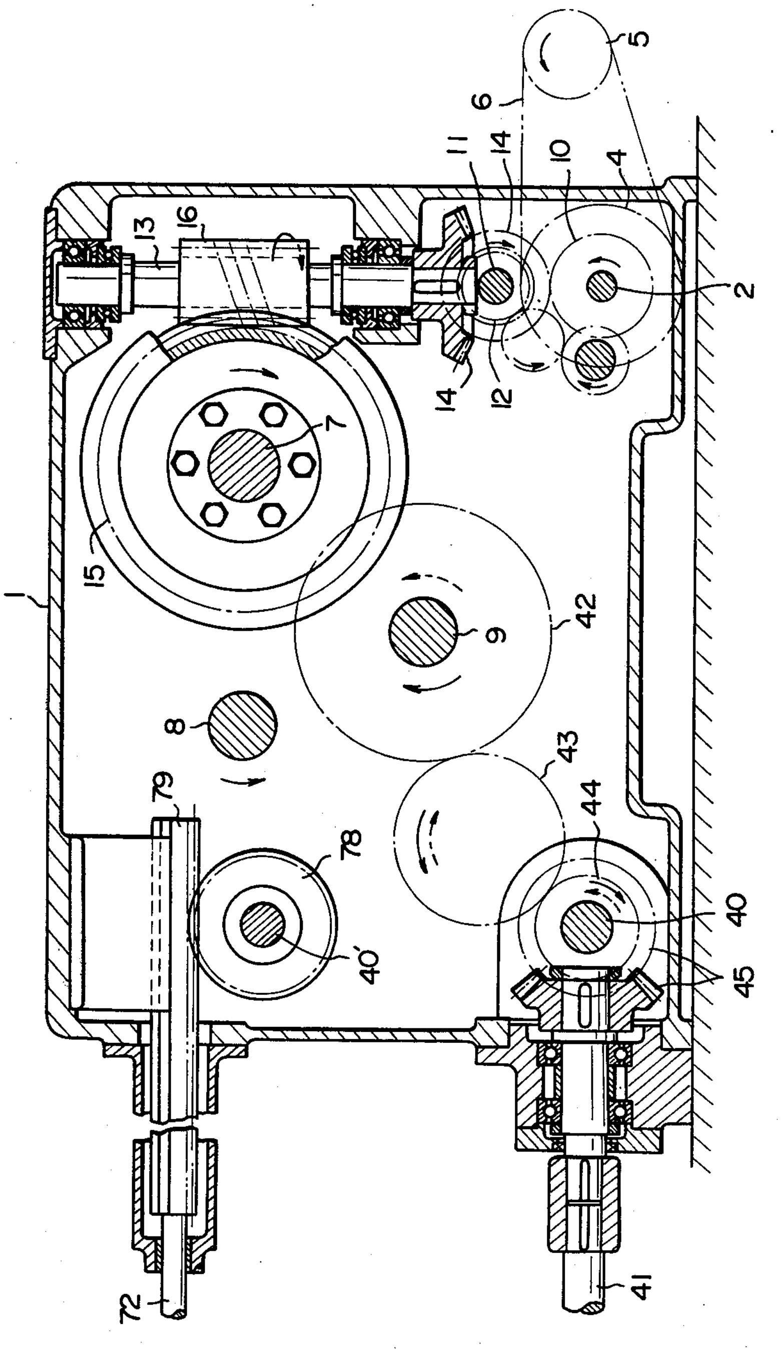
FIG. 2 is a view showing the section taken along the line X—X in FIG. 1.

The driving apparatus 61′ of the present invention is used as the screen driving device, and the driving power of the driving motor 5 is transmitted to the driving apparatus 61′ through a connecting shaft 53. In the interior of the driving apparatus 61 or 61′, there is disposed a mechanism for converting a reciprocative rotation in the normal direction and the reverse direction to a linear reciprocative movement, for example, a combination of a pinion 78 and a rack 79 as shown in FIG. 2, whereby the reciprocative rotation in the normal and reverse directions of the driving apparatus 61 or 61′ is converted to a linear horizontal movement of the screen-driving connecting rod 72 and the flat screen frame 70 is reciprocated in the horizontal direction along the running passage of the material to be printed.

When the driving apparatus 61 or 61' of the present invention is used, while the screen is moved toward the material 64 to be printed (movement of the printing course), the screen can be moved at the same speed as that of the material 64, and it is possible to control precisely the positions of the respective members and the timings of the respective operations so that the material 64 is moved along a distance equal to the length of one repeat while the screen frame 70 performs one cycle of the movement consisting of accelerated advance, constant speed advance, reduced pressure advance, stopping, accelerated retreat, constant speed retreat, reduced speed retreat and stopping.

A shaft 80 disposed between the driving apparatuses 61' and 61' is a connecting shaft for transmitting the reciprocative rotation in the normal and reverse directions to a pinion 78 built in the driving apparatus 61.

The other driving apparatus 61 is used as the device reciprocating the squeegee supporting mechanisms 74 and the receiving roller 68.

In this driving apparatus 61, the alternating normal and reverse rotations of output shaft 41 are transmitted to a squeegee driving sprocket 84 through a series of power transmitting means such as a squeegee accelerating mechanism 81, a squeegee driving shaft 82 and a miter gear case 83. Idle wheels 85 and 86 are disposed on both the terminal portions of the reciprocative movement passage for 9 squeegee supporting mechanism 74, and a roller chain 75 is stretched among these idle wheels 85 and 86 and the squeegee driving sprockets 84 and a plurality of squeegee supporting mechanisms 74 are fixed to the roller chain 75 at suitable intervals through a suitable fixing mechanism. In this arrangement, by the alternating normal and reverse rotations of the squeegee driving sprocket 84, each of the squeegee supporting mechanisms 74 is reciprocated in the lengthwise direction of the machine frame. The receiving roller 68 is connected through a suitable mechanism (not shown) so that it can make a reciprocative movement in the horizontal direction together with the squeegee supporting mechanism 74.

According to the present invention, by virtue of the above-illustrated features, while the screen 71 performs the movement of the printing course, the squeegee member 73 can be scanned from one end of the screen 71 to the other end, and one-cycle movement of the squeegee member 73 can be made precisely in accord with one-repeat movement of the material to be printed.

The rotation of the lifting output shaft 59 detailed hereinbefore with respect to FIGS. 1 to 4 is transmitted to a known lifting device 62 through a known lifting timing-adjusting device 87. By the driving power of this lifting device 62 or 62', the lifting rail 77 is vertically moved through a lifting connecting shaft 88 and a lifting pinion-rack mechanism 89, whereby the position of the receiving roller 68 is controlled so that the receiving roller 68 is at the elevated position during the printing operation and the receiving roller 68 is at the lowered position during the non-printing period.

As will be apparent from the foregoing illustration, according to the present invention, respective operations of the reciprocative movement can be performed precisely and assuredly according to a strictly controlled mechanism, and especially great advantages can be attained when the present invention is applied for reciprocating squeegees and screens in an automatic printing machine of the type where a material to be printed is continuously fed at a constant speed.

Of course, these advantages can also be attained when the present invention is applied to other machines in which precise control of positions or timings is required.

What I claim is:

1. A method for driving an output shaft in the normal direction and the reverse direction alternately, which comprises performing alternately an operation of engaging a partially toothed wheel C connected to the output shaft with a partially toothed wheel A driven in the normal direction and an operation of engaging the partially toothed wheel C connected to the output shaft with a partially toothed wheel B driven in the reverse direction, wherein a cam follower mounted on the output shaft is caused to fall into engagement with a driven and rotated cam at the start and completion of rotation for one of said two operations, whereby acceleration is given to the output shaft at the start of the rotation and the speed of the output shaft is reduced at the completion of the rotaion.

2. A driving method according to claim 1 wherein the partially toothed wheel A is driven and rotated synchronously with the partially toothed wheel B.

3. A driving method according to claim 1 wherein said cam is driven and rotated at a rotation number which is an integral multiple, namely at least 2 times, of the rotation number of the partially toothed wheel A or B.

4. A driving method according to claim 1 wherein said cam comprises first and second cams (*b*) and (*c*) driven and rotated at a constant speed and capable of being engaged with the cam follower, and wherein operations of (1) engaging the partially toothed wheel C with the partially toothed wheel A and rotating the output shaft in the normal direction at a constant speed, (2) engaging said cam follower with the first cam (*b*), reducing the speed of the rotation of the output shaft in the normal direction, stopping the output shaft and rotating the output shaft in the reverse direction under acceleration, (3) engaging the partially toothed wheel C with the partially toothed wheel B and rotating the output shaft in the reverse direction at a constant speed and (4) engaging the cam follower with the second cam (*a*), reducing the speed of the output shaft in the reverse direction, stopping the output shaft and rotating the output shaft in the normal direction under acceleration are repeated at synchronized timings.

5. An apparatus for driving an output shaft in the normal direction and the reverse direction alternately, which comprises a partially toothed wheel C connected to the output shaft, a normal direction-driven, partially toothed wheel A which is engaged with said partially toothed wheel C and driven and rotated in one direction and a reverse direction-driven, partially toothed wheel B which is engaged with said partially toothed wheel C and driven and rotated in a direction reverse to the rotation direction of said partially toothed wheel A, said partially toothed wheels A, B and C being disposed in such a relationship that said partially toothed wheel C is engaged alternately with said partially toothed wheel A and with said partially toothed wheel B, wherein a cam follower is fixed to the output shaft and first and second cams (*b*) and (*a*) are mounted, each of which is driven and rotated at a certain speed and is capable of being engaged with said cam follower, said cam follower and said first and second cams 8*b*) and (*a*) being disposed in such a relationship that the time of termination of the normal rotation of the output shaft by said normal direction-driven, partially toothed wheel A, the cam follower is engaged with a cam groove of said first can (*b*) to reduce the speed of the normal rotation of the output shaft, stop the output shaft and accelerate the output shaft to turn in the reverse direction, and at the time of termination of the reverse rotation of the output shaft by said reverse direction-driven, partially toothed wheel B, the cam follower is engaged with a cam groove of said second cam (*a*) to reduce the speed of the reverse rotation of the output shaft, stop the output shaft and accelerate the output shaft to turn in the normal direction.

6. A driving apparatus as set forth in claim 5 wherein said cam follower is mounted on the end portion of an arm fixed to said output shaft, cam grooves of said first and second cams (*b*) and (*a*) and said cam follower are located on one plane crossing rectangularly said output shaft, and said cams 8*b*) and (*a*) and said cam follower are disposed in such a relationship that by rotation of said arm, the cam follower is caused to fall in engagement with the cam groove of said first cam (*b*) or the cam groove of said second cam (*a*).

7. A driving apparatus as set forth in claim 5 wherein said partially toothed wheels C, A and B are located on one plane crossing rectangularly said output shaft and tooth numbers and positions of said wheels C, A and B are set so that only when the output shaft is driven at a constant speed in the normal direction, the partially toothed wheel C is engaged with the partially toothed wheel A and only when the output shaft is driven in the reverse direction at a constant speed, the partially toothed wheel C is engaged with the partially toothed wheel B.

8. A driving apparatus as set forth in claim 7 wherein planted teeth are disposed for reinforcement at the position where engagement between the partially toothed wheels C and A begins and at the position where engagement between the partially toothed wheels C and B begins.

9. A driving apparatus as set forth in claim 5 wherein each of the cam grooves of said first and second cams (*b*) and (*a*) includes a portion for driving the output shaft at a constant speed, a portion for reducing the speed of the output shaft, a portion for stopping the output shaft and a portion for driving the output shaft under acceleration.

10. A driving apparatus as set forth in claim 5 wherein said first cam (*b*) and said partially toothed wheel A are driven in the same direction synchronously with each other, said second cam (*a*) and said partially toothed wheel B are driven in the same direction synchronously with each other, and the rotation numbers of said first and second cams (*b*) and (*a*) are integral multiples, namely at least 2times, of the rotation numbers of said partially toothed wheels A and B, respectively.

* * * * *

UNITED STATES PATENT AND TRADEMARK OFFICE

CERTIFICATE OF CORRECTION

PATENT NO. : 4,065,980

DATED : January 3, 1978

INVENTOR(S) : Ichinose

It is certified that error appears in the above-identified patent and that said Letters Patent are hereby corrected as shown below:

Claim 4, line 2, delete "(c)", insert --(a)--.

Claim 5, line 19, delete "8", insert --(--.

Claim 5, line 20, after "that", insert --at--.

Claim 6, line 6, delete "8", insert --(--.

Signed and Sealed this

*Thirteenth* Day of *June 1978*

[SEAL]

*Attest:*

RUTH C. MASON
*Attesting Officer*

DONALD W. BANNER
*Commissioner of Patents and Trademarks*